US011003848B2

(12) United States Patent
de Beus (10) Patent No.: US 11,003,848 B2
(45) Date of Patent: May 11, 2021

(54) VARIABLE DATA TEMPLATE MANAGEMENT BY TEMPLATE SHAPE

(71) Applicant: Kyocera Document Solutions Inc., Osaka (JP)

(72) Inventor: Eric de Beus, Redondo Beach, CA (US)

(73) Assignee: Kyocera Document Solutions Inc., Osaka (JP)

( * ) Notice: Subject to any disclaimer, the term of this patent is extended or adjusted under 35 U.S.C. 154(b) by 29 days.

(21) Appl. No.: 16/169,733

(22) Filed: Oct. 24, 2018

(65) Prior Publication Data

US 2020/0134006 A1 Apr. 30, 2020

(51) Int. Cl.
  *G06F 16/35* (2019.01)
  *G06F 40/186* (2020.01)
  *G06F 16/338* (2019.01)

(52) U.S. Cl.
  CPC .......... *G06F 40/186* (2020.01); *G06F 16/338* (2019.01); *G06F 16/35* (2019.01)

(58) Field of Classification Search
  CPC .............................. G06F 16/35; G06F 16/338
  See application file for complete search history.

(56) References Cited

U.S. PATENT DOCUMENTS

| | | | |
|---|---|---|---|
| 6,701,308 B1 | 3/2004 | Chen et al. | |
| 7,180,618 B2 | 2/2007 | Ueda et al. | |
| 10,366,520 B2 * | 7/2019 | Hayakawa | G06K 9/628 |
| 2014/0079323 A1 * | 3/2014 | Thapliya | G06K 9/6202 |
| | | | 382/220 |
| 2018/0286090 A1 * | 10/2018 | Cogan | G06K 15/1867 |
| 2019/0043231 A1 * | 2/2019 | Uzgin | G06F 3/04845 |
| 2019/0294661 A1 * | 9/2019 | Sarkar | G06F 40/30 |

* cited by examiner

*Primary Examiner* — Kyle R Stork
(74) *Attorney, Agent, or Firm* — Sheridan Ross P.C.

(57) ABSTRACT

According to one embodiment, managing a plurality of variable data templates can comprise cataloging, by a template management system, each of the variable data templates according to a shape criteria. The shape criteria of each variable data template can be based on a size and location of one or more variable data fields defined in the template. The cataloged variable data templates can be classified into one or more shape families based on the shape criteria of each variable data template. The template management system can detect a request to locate a variable data template and search the plurality of variable data templates for one or more suggested variable data templates having the shape criteria matching the template. An indication of the suggested variable data templates can be provided by the template management system.

19 Claims, 5 Drawing Sheets

VARIABLE DATA TEMPLATE MANAGEMENT BY TEMPLATE SHAPE

FIELD OF THE DISCLOSURE

Embodiments of the present disclosure relate generally to methods and systems for managing variable data templates and more particularly to managing variable data templates based on shapes representing variable data areas of the templates.

BACKGROUND

Variable data printing systems allow users to define and reuse data templates. A template consists of a collection of variable data fields or areas used to define the placement of variable data in documents generated using the template. When used to generate documents, each variable data field in a template, for example, might receive data, or be generated from data, from a distinct column in a database. Such processes are common, for example, when generating letters, banners, fliers, advertisements, invoices, billing statements, etc.

There are various systems that enable a user to manage variable data templates and other kinds of design templates. What these systems have in common is that the templates are organized the way that a file system is organized, and a user looking for an existing template to reuse must know what it was named, or in what category or folder it was stored. Without this knowledge, the user can spend a lot of time looking for a suitable template or may even recreate from scratch a template that already exists. Hence, there is a need for improved methods and systems for managing and searching variable data templates.

BRIEF SUMMARY

According to one embodiment, a method for managing a plurality of variable data templates can comprise cataloging, by a template management system, each of the plurality of variable data templates according to a shape criteria. The shape criteria of each variable data template can be based on a size and location of one or more variable data fields defined in the variable data template. The cataloged variable data templates can be classified, by the template management system, into one or more shape families based on the shape criteria of each variable data template. The template management system can detect a request to locate a template of the plurality of variable data templates and search the plurality of variable data templates for one or more suggested variable data templates having the shape criteria matching the template. An indication of the one or more suggested variable data templates of the plurality of variable data templates can be provided by the template management system.

According to another embodiment, a system can comprise a processor and a memory coupled with and readable by the processor and storing therein a set of instructions which, when executed by the processor, cause the processor to manage a plurality of variable data templates by cataloging each of the plurality of variable data templates according to a shape criteria. The shape criteria of each variable data template can be based on a size and location of one or more variable data fields defined in the variable data template. The cataloged variable data templates can be classified into one or more shape families based on the shape criteria of each variable data template. A request to locate a template of the plurality of variable data templates can be detected and the plurality of variable data templates can be searched for one or more suggested variable data templates having the shape criteria matching the template. An indication of the one or more suggested variable data templates of the plurality of variable data templates can be provided.

According to yet another embodiment, a non-transitory, computer-readable medium can comprise a set of instructions stored therein which, when executed by a processor, causes the processor to manage a plurality of variable data templates by cataloging each of the plurality of variable data templates according to a shape criteria. The shape criteria of each variable data template can be based on a size and location of one or more variable data fields defined in the variable data template. The cataloged variable data templates can be classified into one or more shape families based on the shape criteria of each variable data template. A request to locate a template of the plurality of variable data templates can be detected and the plurality of variable data templates can be searched for one or more suggested variable data templates having the shape criteria matching the template. An indication of the one or more suggested variable data templates of the plurality of variable data templates can be provided.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
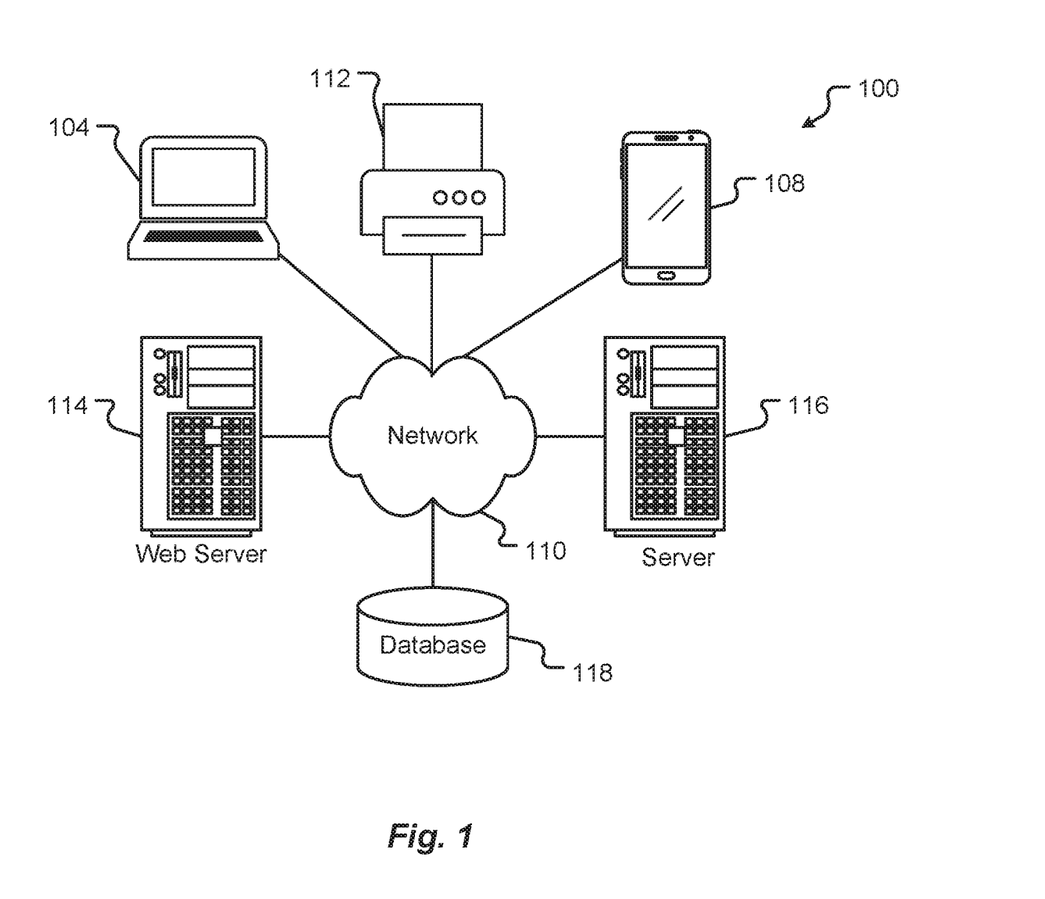
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices 104, 108, and 112, such as a computing device 104, a mobile device 108, and/or Multi-Function Printer (MFP) 112. The computing devices, such as computing device 104, may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. The computing devices 104, 108, and 112 may also have any of a variety of applications, including for example, database client and/or server applications, and web browser applications. Additionally, or alternatively, the computing devices, such as mobile device 108 may be any other electronic device, such as a thin-client computer, Internet-enabled mobile telephone, and/or personal digital assistant, capable of communicating via a network 110 and/or displaying and navigating web pages or other types of electronic documents. MFP 112 can comprise any of a variety of devices offering printing, scanning, copying, faxing, and/or other functions of processing documents. Examples of such devices can include, but are not limited to, the ECOSYS line of MFPs provided by KYOCERA Document Solutions, Inc. Although the exemplary computer environment 100 is shown with two computing devices, any number of user computers or computing devices may be supported.

Environment 100 further includes a network 110. The network 110 can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish available operations as one or more web services.

The environment 100 may also include one or more file and/or application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer devices 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
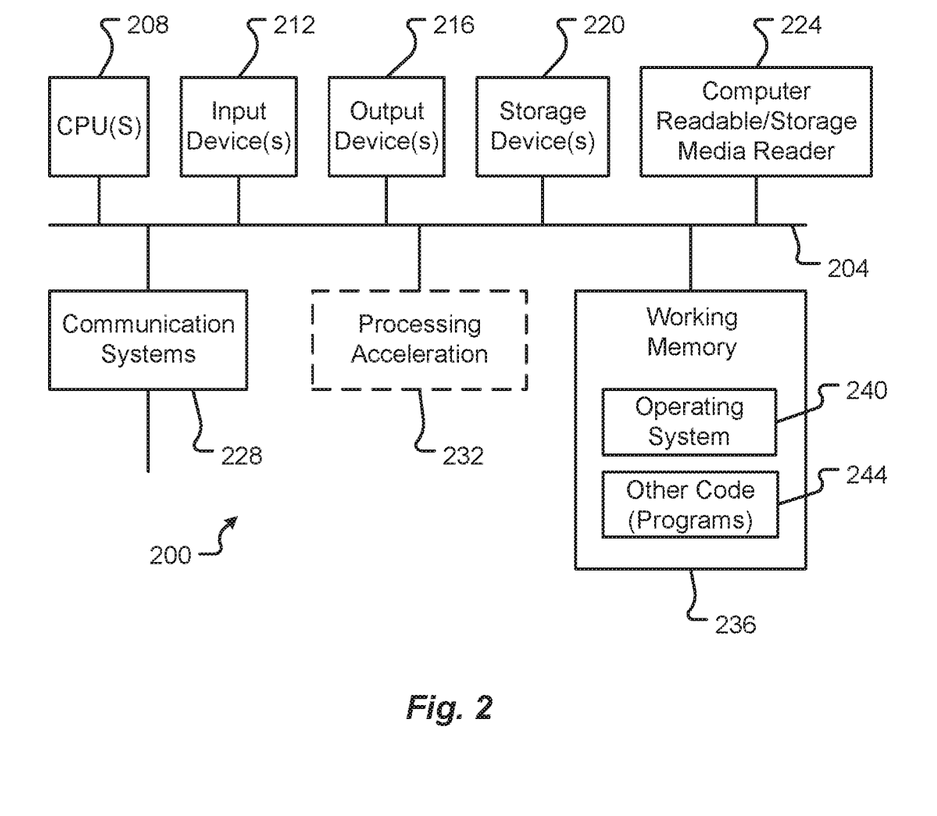
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices 104, 108, and 112, or other systems or components described above may be deployed or executed.

The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
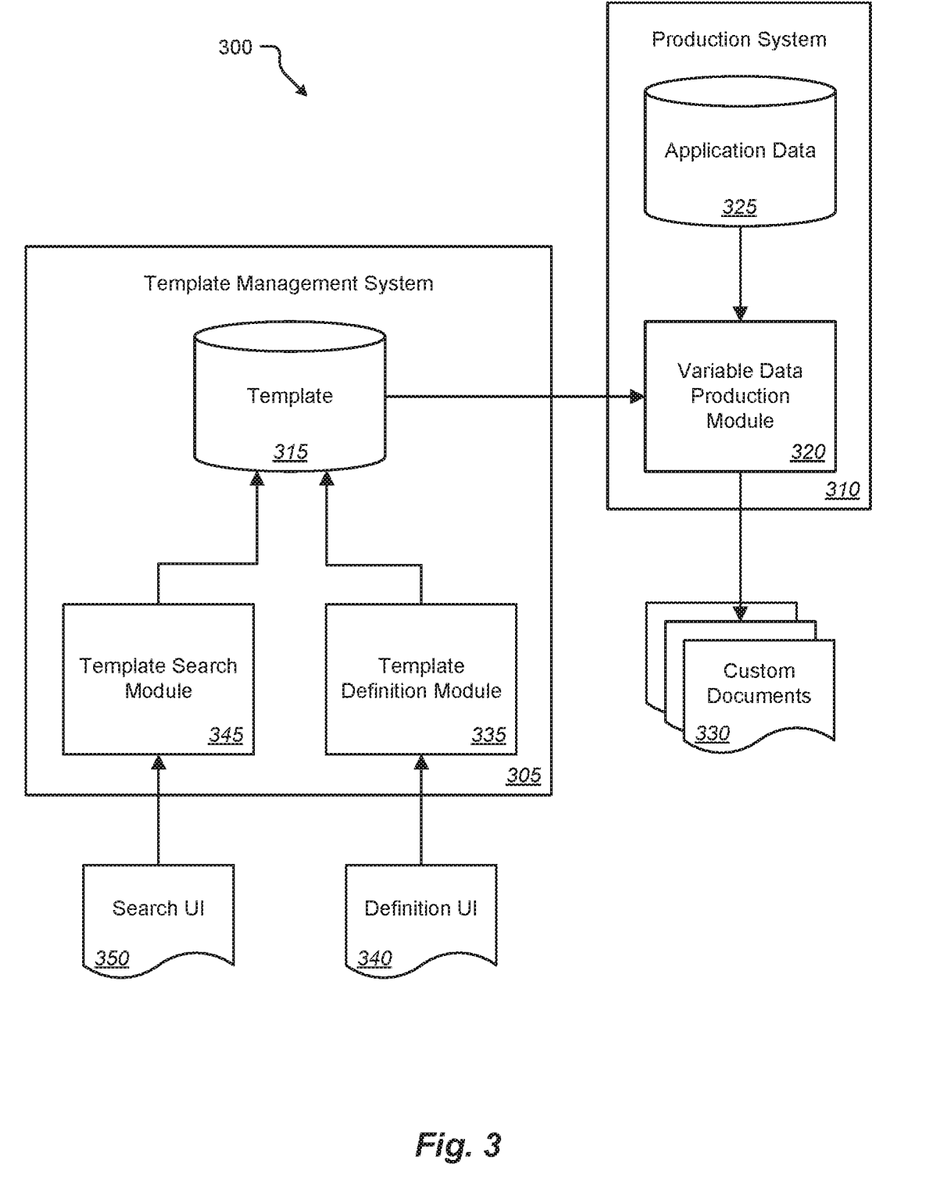
FIG. 3 is a block diagram illustrating an exemplary system for managing and variable data templates according to one embodiment of the present disclosure.

FIG. 3 is a block diagram illustrating an exemplary system for managing variable data templates according to one embodiment of the present disclosure. As illustrated in this example, the system 300 can comprise a template management system 305 and a production system 310 such as a document production system, printshop, etc. The template management system 305 and production system can comprise any of a variety of servers and/or other computers and devices as described above. It should be understood that, while illustrated here as separate systems for the sake of discussion, these systems 305 and 310 can be implemented either together in the same physical and/or virtual machines or separately and, in such a case, can communicate via a LAN, WAN, the Internet and/or any other communications network also as described above. The template management system 305 can maintain a set of templates 315 for use by the production system 310. The templates 315 can define any number of variable data fields. In use, a variable data production module 320 or application of the production system 310 can read the templates 315 and fill the variable data fields with application data 325 to produce any number of custom documents 330.

The template management system 305 can comprise a template definition module 335 which provides a definition user interface 340 through which a user can define and/or edit the templates 315. As the variable data templates 315 are created in this way, or when the template management system 305 is started with an existing set of variable data templates 315, the templates 315 can be cataloged and classified by the template definition module 335 according to their internal shape, external shape, and shape family. Internal shape can be considered the areas of the template covered by the shapes formed by the variable data fields, snapped to a coarse grid. External shape can be considered the internal shape with the shapes connected into one shape. Shape family can be one of single (i.e., one shape, as in an address for a mail merge), double (i.e., two shapes, as in an address and a personalized greeting), collected (i.e., multiple shapes, with the shape dimensions generally greater than the spaces between the shapes), or scattered i.e., (multiple shapes, with the shape dimensions generally smaller than the spaces between the shapes). In some cases, classifying the cataloged variable data templates into one or more shape families can be based on a spectra of a discrete Fourier transform of each variable data template.

As a user is designing a variable data template, for example using template definition module 335 through the definition user interface 340, the partially designed or built template can be analyzed by the template definition module 335 with each change or addition and compared, either by the template definition module 335 or a search module 345 or application, to the existing library of templates 315 by internal shape. The user may then be prompted with a message suggesting that the template being worked on is similar to one that already exists, with the user being shown a thumbnail of the extant template. In other cases, the user may request a search of the existing templates 315 through a search user 350 provided by the search module 345. This request or query can be based on an internal shape, external shape, or shape family indicated by the user through the search user interface 350.

In either case, i.e., a search for an existing template that may match one being built or in response to a query based on shape, search results can be provided to suggest one or more variable data templates. In some cases, the template management system 305 may provide, either through the search user interface 350 or template definition user interface 340, a browsable representation of the plurality of variable data templates. For example, the browsable representation can comprise a grid of thumbnail representations of the plurality of variable data templates wherein each variable data template is represented by a thumbnail depicting the shape criteria of the variable data template.

Figure 4:
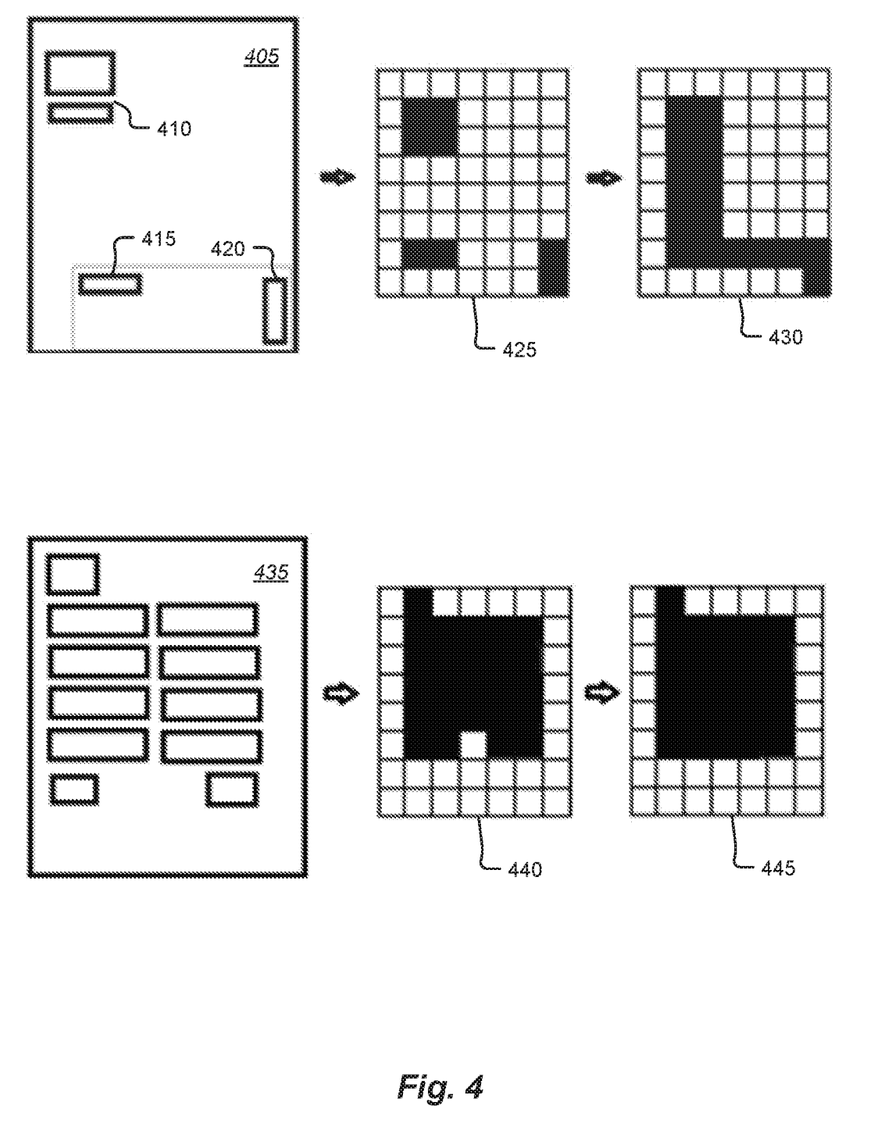
FIG. 4 is a block diagram conceptionally illustrating cataloging of variable data templates based on shape according to one embodiment of the present disclosure.

FIG. 4 is a block diagram conceptually illustrating cataloging of variable data templates based on shape according to one embodiment of the present disclosure. More specifically, this example illustrates a template 405 having a set of variable data fields 410, 415, and 420. As described above, this template can be represented by the internal shape 425 of the variable data fields 410, 415, and 420, i.e., the areas of the template covered by the shapes formed by the variable data fields, snapped to a coarse grid, and the external shape 430, i.e., the internal shape with the shapes connected into one shape. Similarly, another template 435 can be represented by the internal shape 440 and external shape 445 for that template 435. These shapes 425, 430, 440, and 445 can then be the basis of cataloging, categorizing, searching, and browsing the templates 405 and 435 as described herein.

Figure 5:
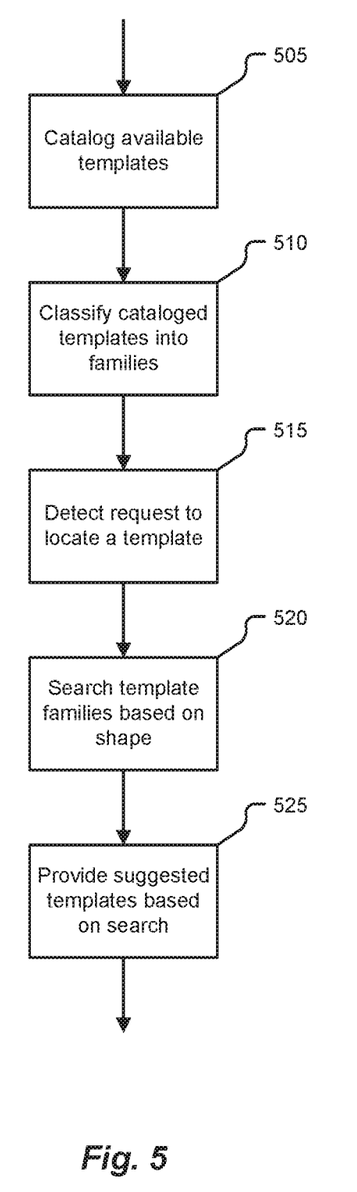
FIG. 5 is a flowchart illustrating an exemplary process for managing variable data templates according to one embodiment of the present disclosure.

FIG. 5 is a flowchart illustrating an exemplary process for managing variable data templates according to one embodiment of the present disclosure. At step 505, as illustrated in this example, managing variable data templates can begin with cataloging, by a template management system 305, each of the plurality of variable data templates according to a shape criteria. The shape criteria of each variable data template can be based on a size and location of one or more variable data fields defined in the variable data template.

At step 510, the template management system 305 can classify the cataloged variable data templates into one or more shape families based on the shape criteria of each variable data template. According to one embodiment, classifying the cataloged variable data templates into one or more shape families based on the shape criteria of each variable data template comprises classifying one or more cataloged variable data templates based on an internal shape criteria of the variable data template, an external shape criteria of the variable data template, or a shape family criteria of the variable data template. The shape family criteria of the variable data template comprises one of a single shape family, a double shape family, a collected shape family, or a scattered shape family. In some cases, classifying the cataloged variable data templates into one or more shape families can be based on a spectra of a discrete Fourier transform of each variable data template.

At step 515, the template management system 305 can detect a request to locate a template of the plurality of variable data templates. Detecting the request to locate the template of the plurality of variable data templates can comprise receiving a query for the template and indicating the shape criteria for the template. In other cases, detecting the request to locate the template of the plurality of variable data templates can comprise detecting a user action related to generation of a new variable data template.

At step 520, the template management system 305 can search the plurality of variable data templates for one or more suggested variable data templates having the shape criteria matching the template. In some cases, searching the plurality of variable data templates can be based on a spectra of a discrete Fourier transform of each variable data template.

At step 525, the template management system 305 can provide an indication of the one or more suggested variable data templates of the plurality of variable data templates. In some cases, the template management system 305 may provide a browsable representation of the plurality of variable data templates. For example, the browsable representation can comprise a grid of thumbnail representations of the plurality of variable data templates wherein each variable data template is represented by a thumbnail depicting the shape criteria of the variable data template.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for managing a plurality of variable data templates, the method comprising:
    cataloging, by a template management system, each of the plurality of variable data templates according to a shape criteria, the shape criteria of each variable data template based on a size and location of one or more variable data fields defined in the variable data template;
    classifying, by the template management system, the cataloged variable data templates into one or more shape families based on the shape criteria of each variable data template, wherein classifying the cataloged variable data templates into one or more shape families based on the shape criteria of each variable data template comprises classifying one or more cataloged variable data templates based on one or more internal shapes of the variable data template, and classifying one or more cataloged variable data templates based on an external shape of the variable data template, and wherein the external shape of the variable data template comprises one shape representing the one or more of the internal shapes connected together;
    detecting, by the template management system, a request to locate a template of the plurality of variable data templates;
    searching, by the template management system, the plurality of variable data templates for one or more suggested variable data templates having a matching external shape; and
    providing, by the template management system, an indication of the one or more suggested variable data templates of the plurality of variable data templates.

2. The method of claim 1, wherein detecting the request to locate the template of the plurality of variable data templates comprises receiving a query for the template, the query indicating the shape criteria for the template.

3. The method of claim 1, wherein detecting the request to locate the template of the plurality of variable data templates comprises detecting a user action related to generation of a new variable data template.

4. The method of claim 1, wherein classifying the cataloged variable data templates into one or more shape families based on the shape criteria of each variable data template further comprises classifying one or more cataloged variable data templates based on a shape family criteria of the variable data template.

5. The method of claim 4, wherein the shape family criteria of the variable data template comprises one of a single shape family, a double shape family, a collected shape family, or a scattered shape family.

6. The method of claim 1, further comprising providing, by the template management system, a browsable representation of the plurality of variable data templates.

7. The method of claim 6, wherein the browsable representation comprises a grid of thumbnail representations of the plurality of variable data templates wherein each variable data template is represented by a thumbnail depicting the shape criteria of the variable data template.

8. The method of claim 1, wherein classifying the cataloged variable data templates into one or more shape families and searching the plurality of variable data templates is based on a spectra of a discrete Fourier transform of each variable data template.

9. The method of claim 1, wherein the templates each include a set of variable data fields, the templates are configured to be represented by a plurality of internal shapes, the internal shapes corresponding to each of the set of variable data fields, respectively, and the external shape is configured to represent one shape composed of the plurality of internal shapes connected with each other.

10. A system comprising:
    a processor; and
    a memory coupled with and readable by the processor and storing therein a set of instructions which, when executed by the processor, cause the processor to manage a plurality of variable data templates by:
cataloging each of the plurality of variable data templates according to a shape criteria, the shape criteria of each variable data template based on a size and location of one or more variable data fields defined in the variable data template;
classifying the cataloged variable data templates into one or more shape families based on the shape criteria of each variable data template, wherein classifying the cataloged variable data templates into one or more shape families based on the shape criteria of each variable data template comprises classifying one or more cataloged variable data templates based on one or more internal shapes of the variable data template, and classifying one or more cataloged variable data templates based on an external shape of the variable data template, and wherein the external shape of the variable data template comprises one shape representing the one or more of the internal shapes connected together;
detecting a request to locate a template of the plurality of variable data templates;
searching the plurality of variable data templates for one or more suggested variable data templates having a matching external shape; and
providing an indication of the one or more suggested variable data templates of the plurality of variable data templates.

11. The system of claim 10, wherein detecting the request to locate the template of the plurality of variable data templates comprises receiving a query for the template, the query indicating the shape criteria for the template.

12. The system of claim 10, wherein detecting the request to locate the template of the plurality of variable data templates comprises detecting a user action related to generation of a new variable data template.

13. The system of claim 10, wherein classifying the cataloged variable data templates into one or more shape families based on the shape criteria of each variable data template further comprises classifying one or more cataloged variable data templates based on a shape family criteria of the variable data template, and wherein the shape family criteria of the variable data template comprises one of a single shape family, a double shape family, a collected shape family, or a scattered shape family.

14. The system of claim 10, wherein the instructions further cause the processor to provide a browsable representation of the plurality of variable data templates, wherein the browsable representation comprises a grid of thumbnail representations of the plurality of variable data templates wherein each variable data template is represented by a thumbnail depicting the shape criteria of the variable data template.

15. The system of claim 10, wherein classifying the cataloged variable data templates into one or more shape families and searching the plurality of variable data templates is based on a spectra of a discrete Fourier transform of each variable data template.

16. A non-transitory, computer-readable medium comprising a set of instructions stored therein which, when executed by a processor, causes the processor to manage a plurality of variable data templates by:
cataloging each of the plurality of variable data templates according to a shape criteria, the shape criteria of each variable data template based on a size and location of one or more variable data fields defined in the variable data template;
classifying the cataloged variable data templates into one or more shape families based on the shape criteria of each variable data template, wherein classifying the cataloged variable data templates into one or more shape families based on the shape criteria of each variable data template comprises classifying one or more cataloged variable data templates based on one or more internal shapes of the variable data template, and classifying one or more cataloged variable data templates based on an external shape of the variable data template, and wherein the external shape of the variable data template comprises one shape representing the one or more of the internal shapes connected together;
detecting a request to locate a template of the plurality of variable data templates;
searching the plurality of variable data templates for one or more suggested variable data templates having a matching external shape; and
providing an indication of the one or more suggested variable data templates of the plurality of variable data templates.

17. The non-transitory, computer-readable medium of claim 16, wherein classifying the cataloged variable data templates into one or more shape families based on the shape criteria of each variable data template further comprises classifying one or more cataloged variable data templates based on a shape family criteria of the variable data template, and wherein the shape family criteria of the variable data template comprises one of a single shape family, a double shape family, a collected shape family, or a scattered shape family.

18. The non-transitory, computer-readable medium of claim 16, wherein the instructions further cause the processor to provide a browsable representation of the plurality of variable data templates, wherein the browsable representation comprises a grid of thumbnail representations of the plurality of variable data templates wherein each variable data template is represented by a thumbnail depicting the shape criteria of the variable data template.

19. The non-transitory, computer-readable medium of claim 16, wherein classifying the cataloged variable data templates into one or more shape families and searching the plurality of variable data templates is based on a spectra of a discrete Fourier transform of each variable data template.

* * * * *